(12) United States Patent
Abdolvand (10) Patent No.: US 11,699,889 B2
(45) Date of Patent: Jul. 11, 2023

(54) HOLLOW-CORE PHOTONIC CRYSTAL FIBER BASED OPTICAL COMPONENT FOR BROADBAND RADIATION GENERATION

(71) Applicant: ASML NETHERLANDS B.V., Veldhoven (NL)

(72) Inventor: Amir Abdolvand, Eindhoven (NL)

(73) Assignee: ASME NETHERLANDS B.V., Veldhoven (NL)

( * ) Notice: Subject to any disclaimer, the term of this patent is extended or adjusted under 35 U.S.C. 154(b) by 0 days.

(21) Appl. No.: 17/621,723

(22) PCT Filed: Jun. 3, 2020

(86) PCT No.: PCT/EP2020/065315
§ 371 (c)(1),
(2) Date: Dec. 22, 2021

(87) PCT Pub. No.: WO2020/259972
PCT Pub. Date: Dec. 30, 2020

(65) Prior Publication Data
US 2022/0247143 A1    Aug. 4, 2022

(30) Foreign Application Priority Data
Jun. 25, 2019    (EP) ..................... 19182142

(51) Int. Cl.
*H01S 3/067* (2006.01)
*G02F 1/365* (2006.01)
(Continued)

(52) U.S. Cl.
CPC .......... *H01S 3/06704* (2013.01); *G02F 1/365* (2013.01); *H01S 3/06741* (2013.01);
(Continued)

(58) Field of Classification Search
CPC ............. H01S 3/06704; H01S 3/06741; H01S 3/094038; H01S 3/305; H01S 3/0092; G02F 1/365
See application file for complete search history.

(56) References Cited

U.S. PATENT DOCUMENTS 6,952,253 B2   10/2005   Lof et al.
6,961,116 B2   11/2005   Den Boef et al.
(Continued)

FOREIGN PATENT DOCUMENTS

EP   1628164   2/2006
EP   2942847   11/2015
(Continued)

OTHER PUBLICATIONS

International Search Report and Written Opinion issued in corresponding PCT Patent Application No. PCT/EP2020/065315, dated Aug. 4, 2020.
(Continued)

*Primary Examiner* — Xinning(Tom) Niu
(74) *Attorney, Agent, or Firm* — Pillsbury Winthrop Shaw Pittman, LLP (57) ABSTRACT

A broadband source device configured for generating broadband radiation or white light output. The broadband source device includes a gas cell, and a hollow-core photonic crystal fiber at least partially enclosed within the gas cell. A gas mixture is within the gas cell and the hollow-core photonic crystal fiber. The gas mixture includes at least one Raman active molecular gas constituting more than 2% of the gas mixture, such that the broadband source device operates in a balanced Kerr-Raman nonlinear interaction regime.

19 Claims, 5 Drawing Sheets

(51) Int. Cl.
*H01S 3/094* (2006.01)
*H01S 3/30* (2006.01)
*H01S 3/00* (2006.01)

(52) U.S. Cl.
CPC ........ *H01S 3/094038* (2013.01); *H01S 3/305* (2013.01); *H01S 3/0092* (2013.01)

(56) References Cited

U.S. PATENT DOCUMENTS

| | | | |
|---|---|---|---|
| 7,265,364 B2 | 9/2007 | Teunissen et al. | |
| 7,283,712 B2 * | 10/2007 | Shaw | G02B 6/02328 385/125 |
| 7,646,471 B2 | 1/2010 | Teunissen et al. | |
| 7,821,704 B1 * | 10/2010 | Pepper | H01S 3/06708 359/344 |
| 8,456,630 B2 * | 6/2013 | Bai | G01N 21/658 356/326 |
| 9,160,137 B1 * | 10/2015 | Abdolvand | H01S 3/0092 |
| 2004/0175085 A1 | 9/2004 | Forbes et al. | |
| 2007/0296960 A1 | 12/2007 | Den Boef et al. | |
| 2008/0198380 A1 | 8/2008 | Straaijer et al. | |
| 2009/0168062 A1 | 7/2009 | Straaijer | |
| 2010/0007863 A1 | 1/2010 | Jordanoska | |
| 2010/0233600 A1 | 9/2010 | Den Boef et al. | |
| 2010/0328655 A1 | 12/2010 | Den Boef | |
| 2011/0026032 A1 | 2/2011 | Den Boef et al. | |
| 2011/0032500 A1 | 2/2011 | Straaijer | |
| 2011/0102753 A1 | 5/2011 | Van De Kerkhof et al. | |
| 2011/0102793 A1 | 5/2011 | Straaijer | |
| 2011/0188020 A1 | 8/2011 | Den Boef | |
| 2011/0249244 A1 | 10/2011 | Leewis et al. | |
| 2012/0044470 A1 | 2/2012 | Smilde et al. | |
| 2012/0044495 A1 | 2/2012 | Straaijer | |
| 2013/0162996 A1 | 6/2013 | Straaijer et al. | |
| 2013/0202006 A1 * | 8/2013 | Rudolph | H01S 3/06741 372/55 |
| 2013/0308142 A1 | 11/2013 | Straaijer | |
| 2015/0261097 A1 | 9/2015 | Mathijssen et al. | |
| 2016/0161863 A1 | 6/2016 | Den Boef et al. | |
| 2016/0370717 A1 | 12/2016 | Den Boef et al. | |
| 2019/0107781 A1 | 4/2019 | Stichting et al. | |

FOREIGN PATENT DOCUMENTS

| | | |
|---|---|---|
| EP | 3136143 | 3/2017 |
| EP | 3480554 | 5/2019 |
| EP | 3531191 | 8/2019 |
| WO | 2016102127 | 6/2016 |
| WO | 2018127266 | 7/2018 |
| WO | 2019068459 | 4/2019 |
| WO | 2019166190 | 9/2019 |
| WO | 2019197117 | 10/2019 |

OTHER PUBLICATIONS

Travers, J.C. et al.: "Ultrafast nonlinear optics in gas-filled hollow-core photonic crystal fibers [Invited]", Optical Society of America, vol. 28, No. 12, (Dec. 2011).

Bartels, R.A. et al: "Impulsive stimulated Raman scattering of molecular vibrations using nonlinear pulse shaping", Chemical Physics Letter 374, pp. 326-333 (2003).

Russell, P. St. J. et al.: "Hollow-core photonic crystal fibres for gas-based nonlinear optics", Nature Photonics, vol. 8, pp. 278-286 (2014).

Kruhlak, R. J. et al.: "Polarization modulation instability in photonic crystal fibers", Optics Letters, vol. 31, No. 10 (2006).

Im, Song-Jin et al.: "High-power soliton-induced supercontinuum generation and tunable sub-10-fs VUV pulses from Kagome-lattice HC-PCFs", Optice Express, vol. 18, No. 6 (2010).

Gebert; F. et al.: "Damage-free single-mode transmission of deep-UV light in hollow-core PCF", Optics Express, vol. 22, No. 13 (2014).

Amrani, F. et al.: "Gas mixture for deep-UV plasma emission in a hollow-core photonic crystal fiber", Optics Letters, vol. 42, No. 17 (2017).

Debord, B. et al.: "Milli-joule energy-level comb supercontinuum generation in atmospheric air-filled inhibited coupling Kagome fiber", 2015 Conference on Lasers and Electro-Optics (CLEO) Postdeadline Paper Digest, Optical Society of America, paper JTh5C.4 (2015).

Hosseini, P. et al.: "Two-octave-wide UV-VIS Raman spectra generated in hollow-core PCF filed with gas mixtures", 2016 Conference on Lasers and Electro-Optics (CLEO), Optical Society of America, pp. 1-2 (2016).

\* cited by examiner

HOLLOW-CORE PHOTONIC CRYSTAL FIBER BASED OPTICAL COMPONENT FOR BROADBAND RADIATION GENERATION

CROSS REFERENCE TO RELATED APPLICATIONS

This application is the U.S. national phase entry of PCT Patent Application No. PCT/EP2020/065315 which was filed on Jun. 3, 2020, which claims the benefit of priority of European Patent Application No. 19182142.0 which was filed on Jun. 25, 2019 and which is incorporated herein in its entirety by reference.

FIELD

The present invention relates to a hollow-core photonic crystal fiber based broadband radiation generator, and in particular such a broadband radiation generator in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools are used in many aspects of the IC manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is required. For various reasons, including measurement robustness and accuracy, broadband or white light radiation sources are increasingly used for such metrology applications. It would be desirable to improve on present devices for broadband radiation generation.

SUMMARY

In a first aspect of the invention there is provided a broadband light source device which is configured for generating broadband or white light output comprising: an optical component comprising: a gas cell, a hollow-core photonic crystal fiber at least partially enclosed within said gas cell; and a gas mixture within said gas cell and said hollow-core photonic crystal fiber, comprising at least one Raman active molecular gas constituting more than 2% of said gas mixture; wherein said broadband light source device is configured to operate in a balanced Kerr-Raman nonlinear interaction regime.

In a second aspect of the invention there is provided a method of generating broadband radiation using an optical component comprising a gas cell, a hollow-core photonic crystal fiber at least partially enclosed within said gas cell; a gas mixture comprising at least one Raman active molecular gas within said gas cell and said hollow-core photonic crystal fiber, and a pump laser in optical connection with the said gas-filled hollow-core photonic crystal fiber; said method comprising: measuring the output radiation, output from said optical component; and evaluating the measured output radiation so as to determine whether the broadband light source device is operating in a balanced Kerr-Raman nonlinear interaction regime.

Other aspects of the invention comprise a broadband light source and metrology device comprising the optical component of the first aspect.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
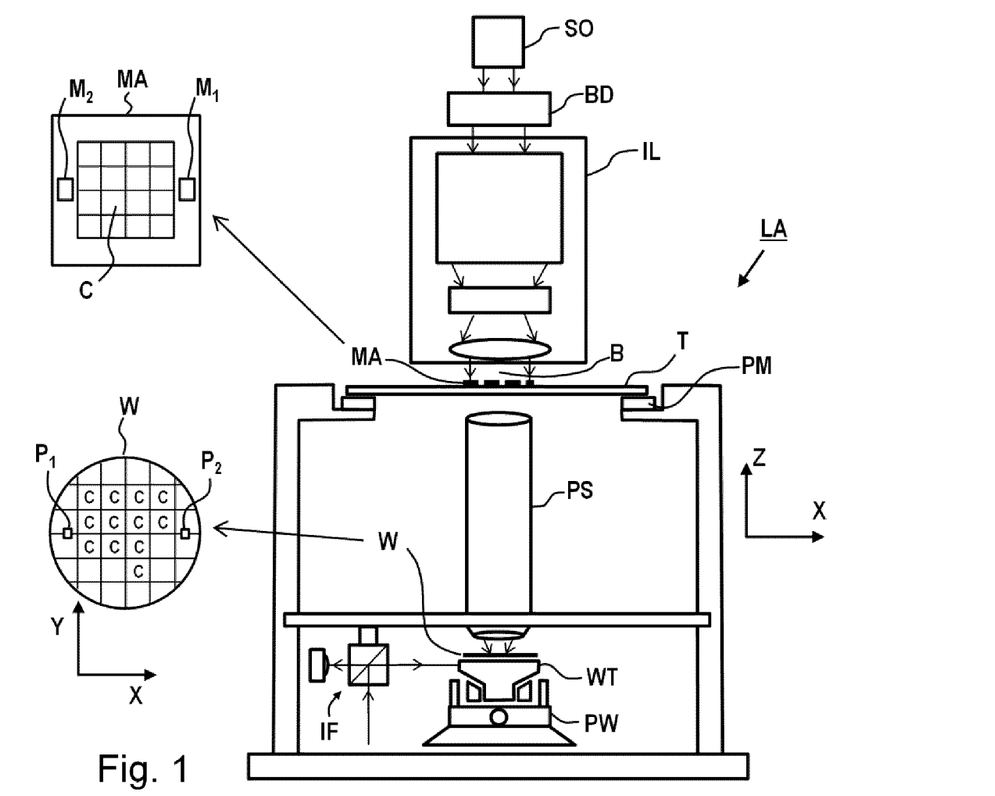
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
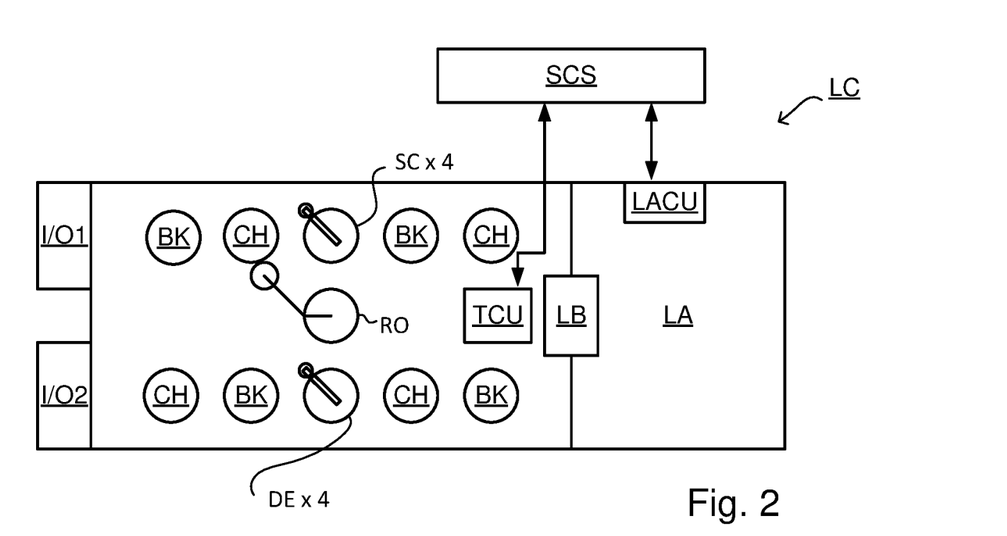
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
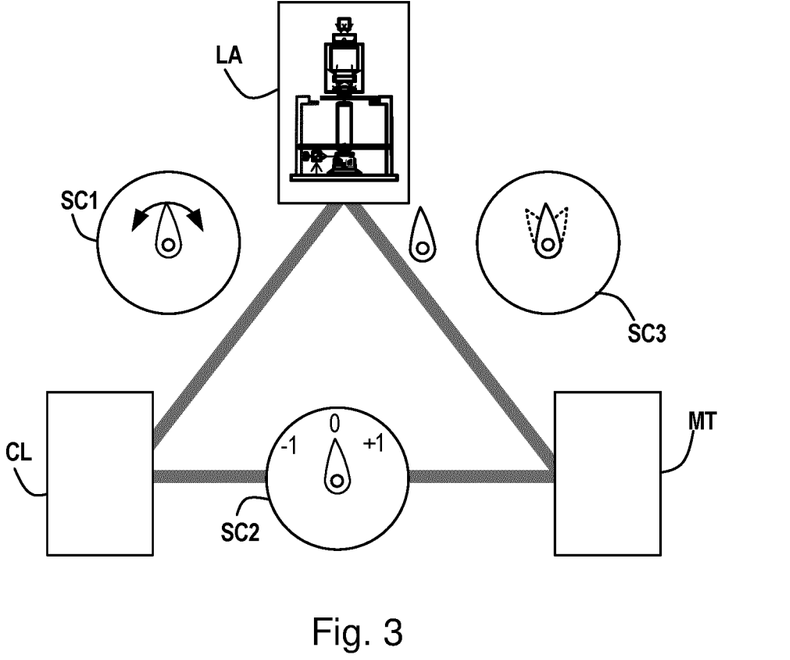
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

Figure 4:
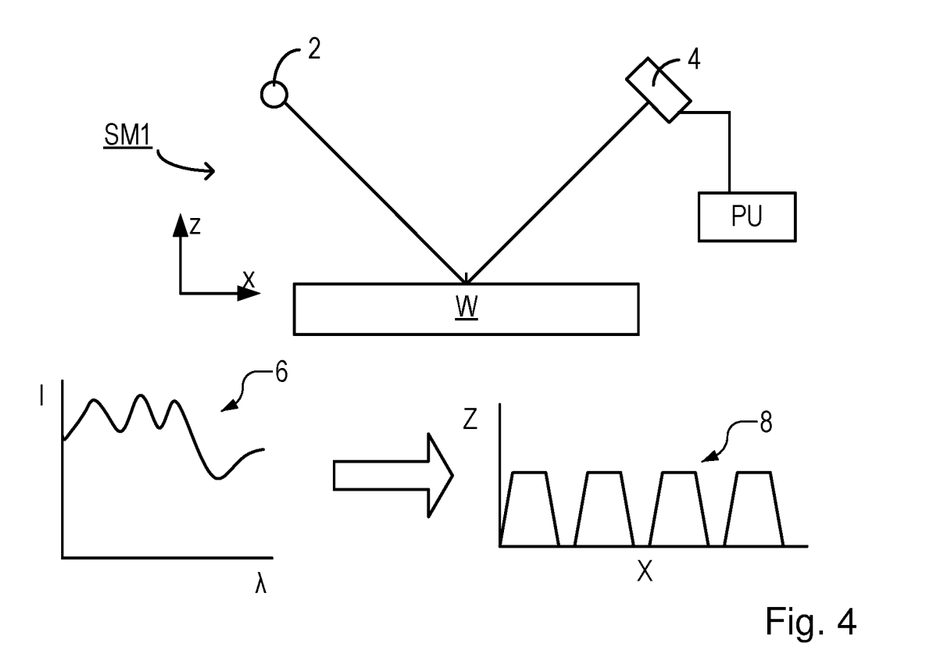
FIG. 4 depicts a schematic overview of a scatterometry apparatus used as a metrology device, which may comprise a radiation source according to embodiments of the invention.

A metrology apparatus, such as a scatterometer, is depicted in FIG. 4. It comprises a broadband (white light) radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
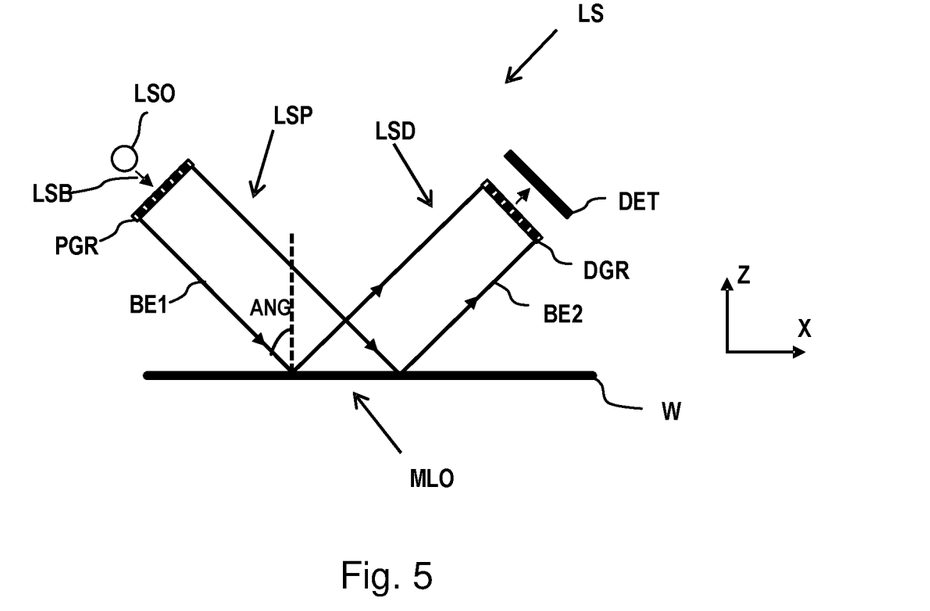
FIG. 5 depicts a schematic overview of a level sensor apparatus which may comprise a radiation source according to embodiments of the invention.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband light source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

Another type of metrology tool used in IC manufacture is an alignment sensor. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 6:
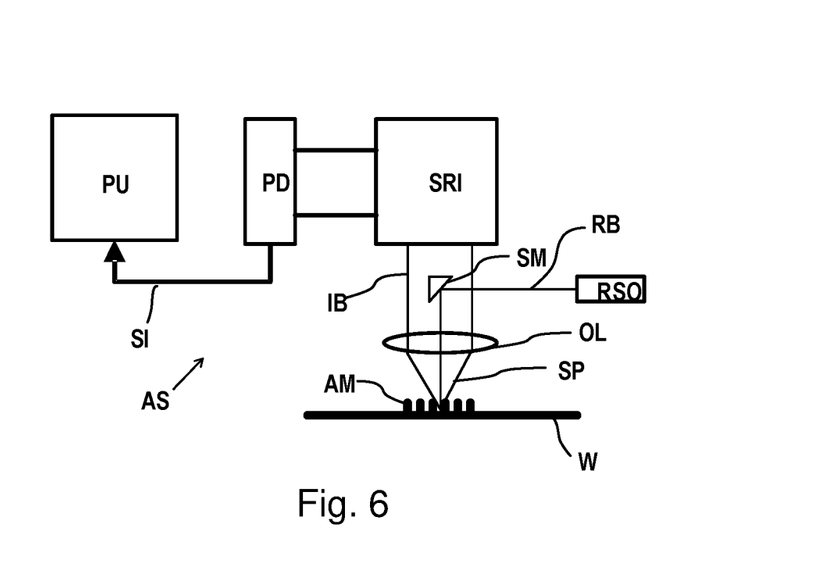
FIG. 6 depicts a schematic overview of an alignment sensor apparatus which may comprise a radiation source according to embodiments of the invention.

FIG. 6 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

For optical semiconductor metrology, inspection applications, such as in any of the aforementioned metrology tools, a bright light source which outputs coherent radiation, simultaneously covering a broad wavelength range (e.g., from UV to IR), is often preferred. Such a broadband light source can help improve the flexibility and robustness of applications by allowing wafers with different material characteristics to be optically examined in the same setup/system without a need for any hardware change (e.g., changing a light source so as to have a specific wavelength). Allowing the wavelength to be optimized for a specific application also means that the accuracy of measurements can be further increased.

Gas lasers, which are based on the gas-discharge effect to simultaneously emit multiple wavelengths, can be used in these applications. However, intrinsic issues such as high intensity instability and low spatial incoherence associated with gas lasers can make them unsuitable. Alternatively, outputs from multiple lasers (e.g., solid-state lasers) with different wavelengths can be spatially combined into the optical path of a metrology or inspection system so as to provide a multiple wavelength source. The complexity and high implementation costs, which increases with the number of wavelengths desired, prevents such a solution from being widely used. In contrast, a fiber-based broadband or white light laser, also called a supercontinuum laser, is able to emit radiation with high spatial coherence and broad spectral coverage, e.g., from UV to IR, and therefore is a very attractive and practical option.

A hollow-core photonic crystal fiber (HC-PCF) is a special type of optical fiber that comprises a central hollow core region and an inner cladding structure surrounding the hollow core, both of which extend axially along the entire fiber. The light guidance mechanism is enabled by the inner cladding waveguide structure, which may comprise, for example, thin-walled glass elements. The radiation is thus confined predominantly inside a hollow core and propagates along the fiber in the form of transverse core modes.

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs).

HC-PCFs comprise hollow channels which are filled with a fluid, such that they possess resultant desired characteristics for various light guiding applications; for example, high-power beam delivery using HC-PBFs and gas-based white light generation (or supercontinuum generation) using HC-ARFs. Detail on the design and manufacture of HC-PCFs can be found in US patent US2004175085 (for HC-PBFs) and European patent application EP3136143A1 (for HC-ARFs), which are incorporated herein by reference. HC-PBFs are configured to offer low loss but narrow bandwidth light guidance via a photonic bandgap effect established by the cladding structure surrounding the central hollow core. Whereas, HC-ARFs are engineered to significantly broaden the transmission bandwidth via anti-resonant reflection of light from the cladding.

Figure 7:
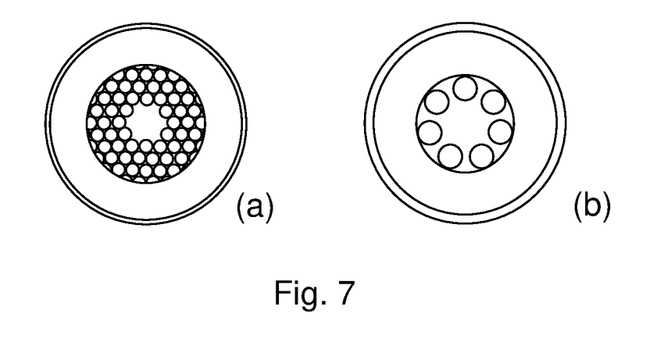
FIG. 7 schematically depicts the transverse cross-sections of the two HC-PCF designs for white light generation, including (a) Kagome design and (b) single-ring design.

FIG. 7 depicts in cross-section, two well-known types of HC-ARFs. FIG. 7(a) shows a Kagome fiber, comprising a Kagome lattice structure. FIG. 7(b) shows a single-ring or revolver fibers, where the hollow core region is formed and surrounded by a layer of non-touching rings.

For gas-based white light generation, a HC-ARF may be comprised within a gas cell, which is designed to operate, for example, at a pressure up to many 10 s of bars (e.g., between 3-100 bar). A gas-filled HC-ARF can act as an optical frequency converter when being pumped by an ultrashort pump laser pulse with sufficient peak power. The frequency conversion from ultrashort pump laser pulses to broadband laser pulses is enabled by a complicated interplay of the dispersion and nonlinear optical processes inside the gas-filled fiber. The converted laser pulses are predominantly confined within the hollow core in the form of transverse core modes and guided to the fiber end. Part of the radiation, for example higher order transverse core modes or specific wavelengths, may leak from the hollow core through the inner cladding waveguide structure and undergoes strong attenuation during its propagation along the fiber. The core region and the cladding region of a HC-ARF can be configured such that the higher order core modes are phase matched to the higher order cladding modes. In this way, the higher order core modes can resonantly couple with the higher order cladding modes which subsequently get attenuated or suppressed. In such a manner, low loss and effectively single transverse mode transmission can be obtained in a broad spectral range.

The spatio-temporal transmission characteristics of a laser pulse, e.g. its spectral amplitude and phase, transmitted along a HC-PCF can be varied and tuned through adjustment of pump laser parameters, filling gas parameters and fiber parameters. Said transmission characteristics may include one or more of: output power, output mode profile, output temporal profile, width of the output temporal profile (or output pulse width), output spectral profile, and bandwidth of the output spectral profile (or output spectral bandwidth). Said pump laser parameters may include one or more of: pump wavelength, pump pulse energy, pump pulse width, pump pulse repetition rate. Said fiber parameters may include one or more of: fiber length, size and shape of the hollow core, size and shape of the cladding structure, thickness of the walls surrounding the hollow core. Said filling gas parameters may include one or more of: gas type, gas pressure and gas temperature.

The filling gas can be a noble gas such as Argon, Krypton, and Xenon, a Raman active gas such as Hydrogen, Deuterium and Nitrogen, or a gas mixture such as an Argon/Hydrogen mixture, a Xenon/Deuterium mixture, a Krypton/Nitrogen mixture, or a Nitrogen/Hydrogen mixture. Depending on the type of filling gas, the nonlinear optical processes can include modulational instability (MI), soliton fission, Kerr effect, Raman effect and dispersive wave generation, details of which are described in WO2018/127266A1 and U.S. Pat. No. 9,160,137B1 (both of which are hereby incorporated by reference). Since the dispersion of the filling gas can be tuned by varying the gas cell pressure, the generated broadband pulse dynamics and the associated spectral broadening characteristics can be adjusted so as to optimize the frequency conversion. The generated broadband laser output can cover wavelengths from UV (e.g., <200 nm) to mid-IR (e.g., >2000 nm).

When a white light output is generated in a noble gas filled HC-ARF, MI is the dominant process for spectral broadening of a pump pulse; the Raman effect being absent. Similarly in a HC-ARF filled with a Raman active gas, MI is the dominant process if the laser pulse is on the order of or shorter than the oscillation time of the dominant (i.e. higher gain) molecular oscillations; The Raman effect being less dominant and resulting in a red-shift of the pump pulse spectral centroid. MI is a physical process which refers to the spontaneous growth of spectral sidebands of a strong narrow-band (compared to the MI modulation frequency) pump pulse in a nonlinear dispersive medium. MI generally arises in the anomalous dispersion regime. But it can also arise in the normal dispersion regime if certain requirements are fulfilled, for example, high order dispersion is present. During the MI process, tiny perturbations present in the electric field (or envelope) of the pulse, e.g., due to quantum fluctuations, are amplified exponentially in the presence of Kerr nonlinearity. The amount of amplification is determined by the MI gain. During such a MI process, the temporal pulse envelope breaks into a plurality of short temporal sub-structures. In parallel to this, spectral side bands are created symmetrically at both sides of the peak pump wavelength resulting in a continuously broadening spectral profile. The pump pulse duration is preferably longer than the inverse of the MI modulation frequency and can range from 100 femtoseconds (fs) to 10 s of picoseconds (ps).

When a molecular gas (in contrast to a noble gas) is used in a HC-ARF for white light generation, both the Raman effect and the Kerr-based MI process contribute to the spectral broadening a pump pulse. However, the Raman effect plays a dominant role when the pulse duration is longer than the dominant Raman active modes. The Raman effect describes a nonlinear optical process in which a pump wave interacts with the gas molecules which excites the molecules into higher or lower vibrational and/or rotational states, resulting in frequency down-shifted Stokes waves or frequency upshifted anti-Stokes waves. When the frequency difference between the pump wave and the generated Stokes/anti-Stokes wave matches exactly to a vibrational/rotational frequency of the gas molecules, the energy transfer between the pump wave and the interacting Stokes/anti-Stokes wave progresses in a stimulated manner leading to the amplification of the Stokes/anti-Stokes wave. The amount of the amplification is determined by the Raman gain. When the intensity of the Stokes wave is sufficiently high, this first Stokes/anti-Stokes wave triggers a further Raman process and subsequently transfers its energy to higher order Stokes and anti-Stokes waves. As a result, a series of discrete Stokes lines are created Similar to the pump wave, these newly generated Stokes and anti-Stokes waves can also undergo SPM via the Kerr nonlinearity, producing additional spectral broadening.

The excited Raman modes, including rotational and vibrational modes, have different oscillation periods. It is known that the Raman effect can be significantly enhanced if the pump pulse is longer than the oscillation period of such excited Raman modes. For example, in the case of Hydrogen gas ($H_2$), the oscillation periods of the rotational mode and the vibrational mode are 57 fs and 8 fs, respectively. However, if excited with a pump pulse having a pulse duration on the order of or shorter than 8 fs, the Raman modes of the Hydrogen gas are excited impulsively, resulting in a red-shift of the centroid wavelength of the pump pulse spectrum.

Different gas mixtures have also been previously described in the context of HC-ARF based white light generation. The gas mixtures may comprise or consist of one or more noble gases and one or more Raman active molecular gases. Hence, both the Raman nonlinearity and the Kerr nonlinearity are involved in spectral broadening of a pump pulse. However, the reported gas mixtures are either dominated by the atomic noble gases or by the Raman active molecular gases and as such the nonlinear frequency conversion process is either dominated entirely by the Kerr based MI or by the Raman effect. For example, for a gas mixture comprising only a 2% Raman active $H_2$ gas, the Raman nonlinearity is too small to be effective in white light generation.

In the case where Kerr nonlinearity is dominant, manifested by a stronger MI gain, the spectral power density of the output spectral profile will be imbalanced, i.e. the intensity in one spectral region is much lower than in another. In order to obtain a balanced (or flat) spectral profile, further optimization has to be performed which enhances light generation in those spectral regions where the original intensity is lower. The ratio between the maximum intensity of the output spectral profile and the minimum intensity of the output spectral profile (e.g., away from the spectral region around the pump pulse; e.g., by ±50 nm, ±100 nm, ±150 nm or ±200 nm), may be 2, 3, 4, 5, or 10 to one. For example, the flatness of the spectral profile may be better than 10 dB or better than 5 dB such that the spectrum generated in the desired wavelength range (e.g., from below 400 nm to 2000 nm), when compared to the peak of the output spectrum (which is normally around the pump), drops only by 10 dB or 5 dB. Depending on the pump wavelength, such spectral regions may be visible region or infrared region. Whereas in the case where the Raman effect is dominant, manifested by a much stronger Raman gain, a peaky output spectral profile, exhibiting a plurality of discrete Stokes frequencies will be expected. To obtain a smooth and broad spectral profile, higher pump energies should be used.

A method for balancing the Kerr nonlinearity and the Raman nonlinearity in a gas filled HC-ARF based broadband light source is disclosed herein. The method is enabled by the use of a gas mixture having an optimized mixing ratio between noble gases and Raman active molecular gases or two Raman active gases. In such a manner, a broader and smoother spectral profile can be achieved without the need of further optimization of light generation in a specific spectral region where the intensity is lower, or use of higher pump energies to connect up the generated discrete frequencies.

It should be understood that "balancing", "balanced" or "optimally balanced" should be understood to describe a regime in which both effects are present, but are not necessarily of equal strength (although they can be). Such a regime may comprise the relevant parameters being such that the Raman effect causes the pulse to develop at least one spectral sideband (called Stokes for lower frequency sidebands and anti-Stokes for higher frequency sidebands) while the Kerr effect broadens each sideband until the sidebands' spectra are overlapped and a broad spectrum is generated. Another possible balanced regime may comprise a regime where the Kerr nonlinearity broadens the pump pulse and causes a MI-driven supercontinuum to form at which point the pulse comprises very short temporal structures which are further broadened and frequency-mixed through Raman effect. These regimes will now be described in more detail.

More specifically, in one such example where the Kerr nonlinearity and Raman nonlinearity are optimally balanced in a HC-ARF, a broad pump pulse undergoes the MI process first and breaks into a train of ultrashort pulses, each ultrashort pulse being shorter or comparable in their duration with the period of the molecular Raman active oscillations, which subsequently result in the excitation of different Raman modes of the Raman active molecular gases of the gas mixture via impulsive Raman scattering. Impulsive excitation of Raman modes is able to produce additional spectral broadening and mixing, and hence is beneficial for white light generation. The desired/optimal mixing ratio of a gas mixture depends on the relative strength between the Raman nonlinearity of Raman active molecular gases and the combined Kerr nonlinearity of noble gases and Raman active molecular gases. With an optimized gas mixture, the HC-ARF based broadband source can be operated in a regime where the Kerr nonlinearity and the Raman nonlinearity are optimally balanced such that a broadband output with a flat and smooth spectral profile will be obtained. This Kerr-Raman balanced nonlinear interaction regime can be enabled by choosing a suitable set of operating parameters.

In another example where the Kerr nonlinearity and Raman nonlinearity are optimally balanced in a HC-ARF, a broad pump pulse, longer than the strongest Raman active oscillation of the working gas, undergoes the Raman process first and develops at least one Stokes (or lower frequency) sideband and/or anti-Stokes (or higher frequency) sideband while the Kerr effect broadens the pump pulse and each individual sideband spectrally. The spectrally broadened pump pulse and sidebands overlap and generate a broad spectrum. The gas mixture may be a mixture of a Raman active and noble gas or a mixture of at least two Raman active gases. The desired/optimal mixing ratio of a gas mixture depends on the relative strength between the Raman nonlinearity of Raman active molecular gases and the combined Kerr nonlinearity of the gas mixture. With an optimized gas mixture, the HC-ARF based broadband source can be operated in a regime where the Kerr nonlinearity and the Raman nonlinearity are optimally balanced such that a broadband output with a flat and smooth spectral profile will be obtained. This Kerr-Raman balanced nonlinear interaction regime can be enabled by choosing a suitable set of operating parameters.

Figure 8:
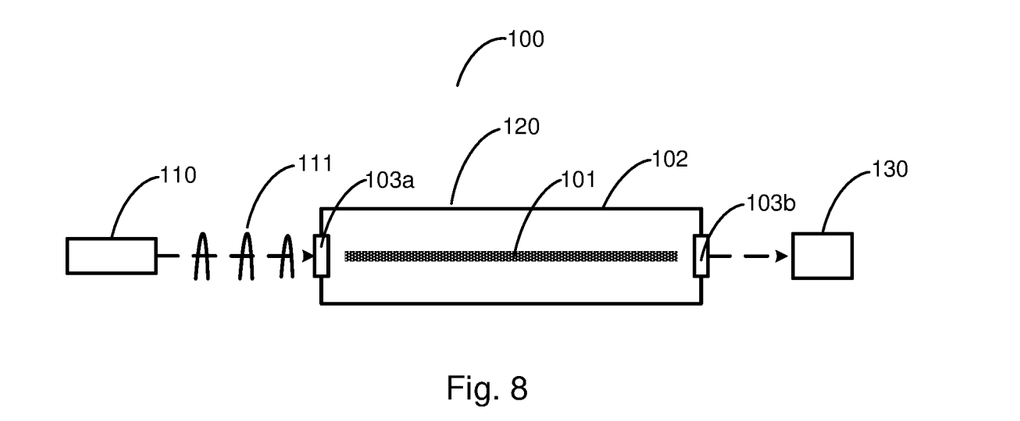
FIG. 8 schematically depicts a gas filled HC-PCF based broadband light source device.

As illustrated in FIG. 8, a broadband light source device 100 comprises a pump laser 110 outputting a train of pump pulses 111, an optical component 120 spectrally broadening the input pump pulse and an optical diagnostic device 130 measuring the output broadband spectrum. The optical component 120 comprises a HC-PCF (e.g., a HC-ARF) 101 having a specific fiber length and a gas cell 102 filled with a working gas or a gas mixture at a specific pressure or with a pressure distribution. The gas cell 102 further comprises an input optical window 103a and an output optical window 103b, located at respective ends of the gas cell 102. The input optical window 103a is operable to admit ultrashort pump laser pulses into the gas cell 102 via the window. After being coupled into the gas-filled HC-PCF 101, pump laser pulses 111 propagate along the fiber where they experience significant spectral broadening. Resultant broadband laser pulses are subsequently discharged from the gas cell 102 via the output optical window 103b and measured by the optical diagnostic device 130 (e.g. a spectrometer).

To fill the HC-PCF 101 with a working gas, the gas cell 102 may be in communication with a pressurized gas supply or reservoir (not shown). The inner surfaces of the walls and windows 103a, 103b of the gas cell 102 enclose a cavity. The axis of the gas cell is parallel to the axis of the HC-PCF 101.

FIGS. 9(a)-(c) schematically depicts three known configurations of the optical component 120, 120', 120". FIG. 9(a) illustrates a first configuration where the entire HC-PCF 101 is comprised within a single gas cell 102. FIG. 9(b) illustrates an alternative arrangement where the entire HC-PCF 101 is comprised in several (e.g., three) sub-cells 102a, 102b, 102c which are interconnected by using an appropriate sealing mechanism 105. The pressure-tight connections ensure all the sub-cells to reach the same pressure desired for white light generation. FIG. 9(c) illustrates another configuration where the two fiber ends 101a, 101c of the HC-PCF 101 are comprised in two separate gas cells 102d,102e respectively, while a central portion 101b of the fiber, acting as a fluid connection, is comprised outside of the gas cells.

In one embodiment, the working gas mixture may comprise or consist of one or more noble gases (e.g. Argon, Xenon, Krypton, Neon, Helium gas) in combination with one or more Raman active molecular gases (e.g. Hydrogen Hz, Nitrogen $N_2$, Deuterium, $CO_2$, $SF_6$ gas). Alternatively, the working gas mixture may comprise or consist of a mixture of two (or more) Raman active molecular gases (for example, any combination of two of Hydrogen Hz, Nitrogen $N_2$, Deuterium, $CO_2$, $SF_6$, e.g., $H_2$—$N_2$ or $H_2$—$CO_2$). In the above, "comprises" describes including these gasses, but not necessarily to the exclusion of other gases and "consists of" describes comprising only these gases.

The mass ratio of the working gas mixture may be such that the Raman active molecular gas is or greater than 2% of the working gas mixture; e.g., equal to or greater than 5% or 10% of the working gas mixture. For example, the Raman active gas may be between 10% and 90%, between 10% and 80%, between 10% and 70%, between 10% and 60%, between 10% and 50%, between 10% and 40% or between 10% and 30%; and more specifically it may be: 10%, 15%, 20%, 25%, or 30%, of the active gas mixture.

The HC-PCF 101 used in such an embodiment is a HC-ARF which may employ the Kagome design or the single-ring design with reference to FIG. 7. Alternatively, other fiber designs (not shown) such as inhibited coupling designs, hypocycloid-core Kagome, and nested tubular designs may be used. The pump pulse duration may be chosen to be greater than 100 fs, and more specifically within the range of: 100 fs to 100 ps, 100 fs to 30 ps or 100 fs to 1 ps for example, such that the pump pulse is longer than the fastest oscillation period of the Raman modes of the Raman active molecular gas (e.g., in the case of Hydrogen gas, 57 fs for the rotational mode and 8 fs for the vibrational mode). The chosen pump pulse may be 100 fs, 150 fs, 200 fs, 250 fs, 300 fs, 350 fs, 400 fs, 450 fs, 500 fs, 600 fs, 700 fs, 800 fs, 900 fs, 1 ps, 10 ps, 20 ps, 30 ps, 100 ps. The pump wavelength may be chosen from the visible regime, near-IR regime or mid-IR regime. The pump laser pulses may have a repetition frequency of several-hundred hertz (Hz), kilohertz (kHz), or megahertz (MHz). In particular the repetition rate may be chosen to be in the range of 300 kHz to 100 MHz, such as 300 kHz, 500 kHz, 1 MHz, 5 MHz, 10 MHz, 20 MHz, 30 MHz, 40 MHz.

A set of operating parameters is purposely chosen such that the broadband light source device is operated in the anomalous dispersion regime, which is in favor of the Kerr-based MI process. A much higher percentage of the Raman active gas enables a stronger Raman nonlinearity (or Raman gain). The operating parameters may include one or more of: pump laser parameters, fiber parameters, and filling gas parameters. The generated broadband output exited from the output optical window 103b is fed into an optical diagnostic device 130 for spectral measurement. By gradually varying some operating parameters, for example, one or more pump laser parameters and/or the pressure of the gas mixture, the change of the output spectrum is actively monitored by the optical diagnostic device 130.

Before entering the balanced nonlinear interaction regime, the output spectrum would either exhibit a plurality of discrete spectral lines or a (approximately) symmetrically broadened spectrum suggesting the light source is either being operated in the Raman effect dominated regime or the Kerr effect dominated regime, respectively. Once the laser enters the balanced nonlinear interaction regime, where the Kerr nonlinearity and the Raman nonlinearity are balanced, the output spectrum exhibits a significant spectral broadening. This may also be accompanied by some weak Raman sidebands, suggesting a well-balanced nonlinear interaction between the Kerr-based MI process and the Raman process. Generated in the balanced nonlinear interaction regime, the broadband coherent radiation may comprise, for example a wavelength range of 200 nm to 2000 nm, or any sub-range within this range. Such sub-ranges may comprise, for example, the visible wavelength range (e.g., 400-700 nm), between 400 nm and 1700 nm, between 400 nm and 1500 nm, between 200 nm and 700 nm, or between 400 nm and 1700 nm.

In an embodiment, the device may comprise a processor operable to evaluate the measured output radiation so as to determine whether the broadband light source device is operating in the balanced Kerr-Raman nonlinear interaction regime. The evaluation may comprise measuring whether an output spectrum of the output radiation is flat and/or smooth over a range of wavelengths. The evaluation may also comprise determining whether the output spectrum of the broadband light source device exhibits a redshift of the centroid of the spectrum, and possibly also whether one or more Raman sidebands are present. The processor may be operable to optimize values for one or more the aforementioned operating parameters, so as to ensure operation in the balanced Kerr-Raman nonlinear interaction regime.

In another embodiment (as before) the working gas mixture may comprise one noble gas (e.g. Argon gas) and one Raman active molecular gases (e.g. Hydrogen gas). The Raman active molecular gas is equal to or greater than 10% of the working gas mixture and may be between 10% and 90%, between 10% and 80%, between 10% and 70%, between 10% and 60%, between 10% and 50%, between 10% and 40% or between 10% and 30%, of the working gas mixture, for example. The HC-PCF 101 used in this embodiment is a HC-ARF which may employ the Kagome design or the single-ring design with reference to FIG. 7, or alternatively another fiber designs (e.g., inhibited coupling designs and nested tubular designs). The pump pulse duration may be chosen to be in the range of 100 fs to 100 ns such that the pump pulse is longer than the oscillation periods of the excited Raman modes of the Raman active molecular gas.

However, in this embodiment, a different set of operating parameters is purposely chosen such that the broadband light source device is operated in the normal dispersion regime, where the MI process is less dominant. With the help of strong high order dispersion, the pump spectrum is quickly broadened via SPM and extended into the anomalous dispersion regime where the MI process is enabled. Subsequently, a balanced nonlinear interaction is triggered and an enhanced broadband output is obtained thereafter.

In other embodiments, the working gas mixture may comprise or consist of one noble gas and a Raman active molecular gas mixture further comprising or consisting of two or more Raman active gases. Or alternatively the working gas mixture may comprise or consist of one noble gas mixture and one Raman active molecular gas. The aforementioned mixture ratios (of the Raman active molecular gas mixture or Raman active molecular gas as appropriate), fiber designs and pulse durations are equally applicable to this embodiment. In this embodiment, the broadband light source device can work either in the anomalous dispersion regime or the normal dispersion regime. A balanced nonlinear interaction regime is formed when the Raman process and the Kerr-based MI process are complementary to each other, resulting in a broad and smooth output spectrum.

In another embodiment, the working gas mixture may comprise or consist of two or more Raman active molecular gases, such as $H_2$—$N_2$, $D_2$-$N_2$, $H_2$-$D_2$, $N_2$-$D_2$ mixtures. The pulse duration of the pump pulse may be chosen to be longer than the strongest oscillation periods of the working gas. For $H_2$ this would be the 57 fs (rotational mode) and 8 fs (vibrational mode). In particular the pump pulse might be in the range of from 100 fs to 100 ps (e.g., 200 fs, 300 fs, 400 fs, 500 fs, 800 fs, 900 fs, 1 ps, 5 ps, 10 ps, 20 ps, 30 ps). For an optimally balanced Kerr and Raman nonlinearities in a HC-ARF, the pump undergoes Raman process first and develops at least one spectral sideband while the Kerr effect broadens the pump and each individual sideband spectrally. The spectrally broadened pump pulse and sidebands overlap and generate a broad spectrum.

A broadband light source device being configured to operate in the Kerr-Raman balanced nonlinear interaction regime disclosed herein, comprises a working gas mixture comprising at least two different gases which may comprise or consist of a noble gas and a Raman active molecular gas or two different Raman active molecular gases.

Figure 9:
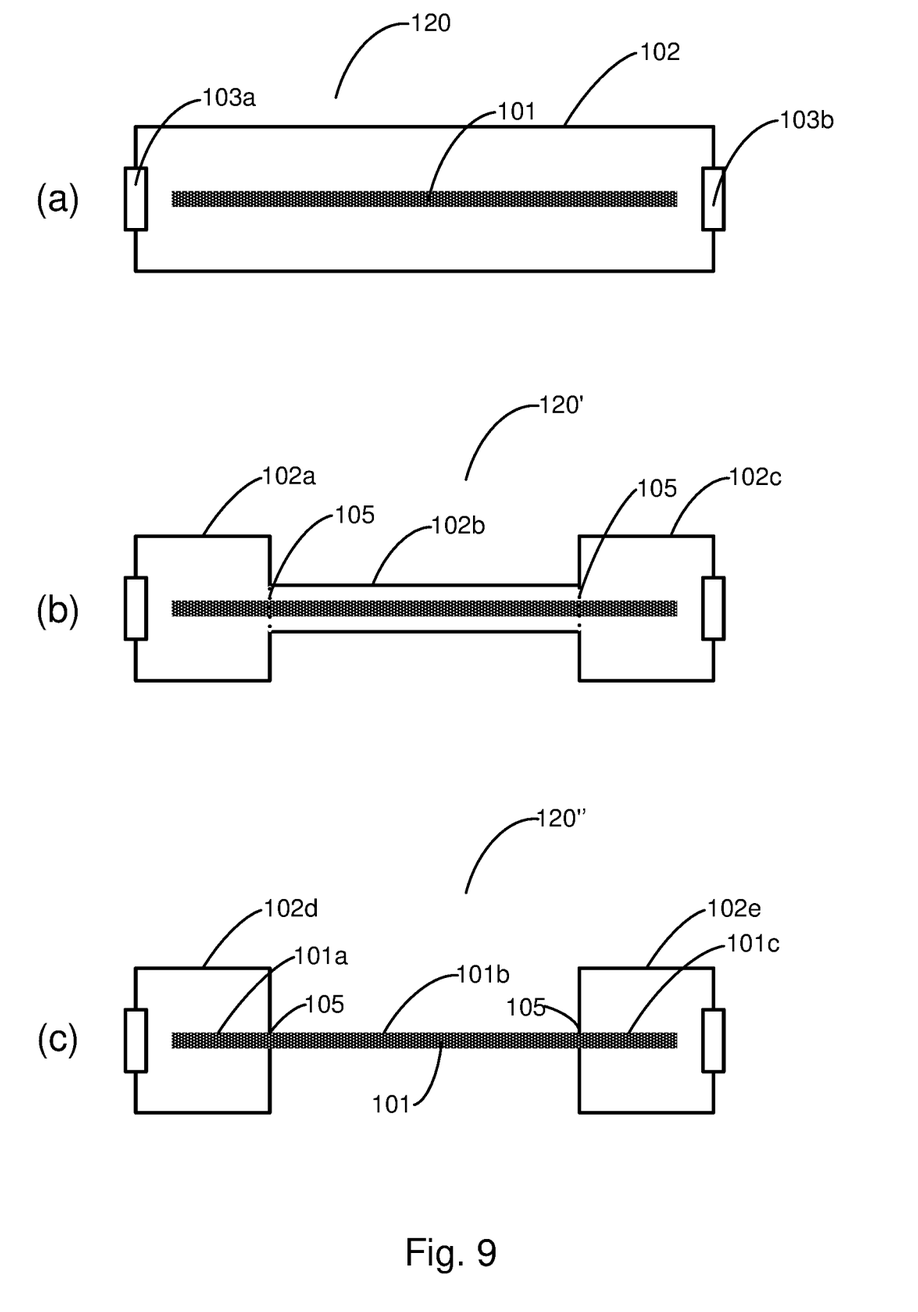
FIG. 9 (a)-(c) schematically depicts examples of optical components in three different configurations.

A broadband light source device being configured to operate in the Kerr-Raman balanced nonlinear interaction regime disclosed herein, comprises an optical component which may be configured to any one of the configurations with reference to FIG. 9.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Further embodiments according to the present invention are described in below numbered clauses:

1. A broadband light source device, being configured for generating a broadband output, comprising:
   an optical component, comprising:
   a gas cell,
   a hollow-core photonic crystal fiber at least partially enclosed within said gas cell; and
   a gas mixture within said gas cell and said hollow-core photonic crystal fiber, comprising
   at least one Raman active molecular gas constituting more than 2% of said gas mixture;
   wherein said broadband light source device is configured to operate in a balanced Kerr-Raman nonlinear interaction regime.

2. A broadband light source device according to clause 1, wherein said at least one Raman active molecular gas constitutes at least 5% of said gas mixture.

3. A broadband light source device according to clause 1, wherein said at least one Raman active molecular gas constitutes at least 10% of said gas mixture.

4. A broadband light source device according to any preceding clause, wherein said balanced Kerr-Raman nonlinear interaction regime is defined by complementary processes comprising a Raman process and a Kerr-based modulational instability process, such that the output spectrum of said broadband light source device exhibits a spectral broadening.

5. A broadband light source device according to clause 4, operable such that said balanced Kerr-Raman nonlinear interaction regime is enabled by an optimization of one or more set of operating parameters, wherein said operating parameters comprises one or more of: one or more pump laser parameters relating to a pump laser for outputting a plurality of said pump pulses for exciting said gas mixture, one or more fiber parameters relating to said hollow-core photonic crystal fiber, and one or more gas mixture parameters relating to said gas mixture.

6. A broadband light source device according to clause 5, operable such that the pulse duration of said pump pulses is longer than fastest oscillation period of Raman modes of said Raman active molecular gas.

7. A broadband light source device according to clause 6, operable such that the pulse duration of said pump pulses comprises a duration in a range of 100 fs to 30 ps.

8. A broadband light source device according to clause 6, operable such that the pulse duration of said pump pulses comprises a duration in a range of 100 fs to 1 ps.

9. A broadband light source device according to any of clauses 5 to 8, operable such that said balanced Kerr-Raman nonlinear interaction regime is formed with the pump laser in an anomalous dispersion regime.

10. A broadband light source device according to any of clauses 5 to 8, operable such that said balanced Kerr-Raman nonlinear interaction regime is formed with the pump laser in a normal dispersion regime.

11. A broadband light source device according to any preceding clause, further comprising a pump laser for outputting a plurality of said pump pulses.

12. A broadband light source device according to any preceding clause, wherein said gas mixture comprises at least one noble gas and said at least one Raman active molecular gas.

13. A broadband light source device according to clause 12, wherein said gas mixture comprises a mixture of noble gases and a single Raman active molecular gas.

14. A broadband light source device according to clause 12, wherein said gas mixture comprises a single noble gas and a mixture of Raman active molecular gases.

15. A broadband light source device according to clause 12, wherein said working gas mixture comprises mixture of noble gases and a mixture of Raman active molecular gases.

16. A broadband light source device according to any of clauses 1 to 11, wherein said gas mixture comprises a mixture of at least two Raman active molecular gases.

17. A broadband light source device according to clause 15, wherein said gas mixture consists of a mixture of two Raman active molecular gases.

18. A broadband light source device according to any preceding clause, wherein said hollow-core photonic crystal fiber is wholly comprised within the gas cell.

19. A broadband light source device according to any of clauses 1 to 17, wherein said gas cell comprises a plurality of sub-cells, said plurality of sub-cells comprising at least two end sub-cells, enclosing respective ends of said hollow-core photonic crystal fiber.

20. A broadband light source device according to any preceding clause, wherein said at least one Raman active molecular gas constitutes between 10% and 30% of said gas mixture.

21. A broadband light source device according to any preceding clause, further comprising an optical diagnostic device for measuring the output radiation, output from said optical component.

22. A broadband light source device according to clause 21, comprising a processor operable to evaluate the measured output radiation so as to determine whether the broadband light source device is operating in the balanced Kerr-Raman nonlinear interaction regime.

23. A broadband light source device according to clause 22, wherein the processor is operable such that the evaluation comprises evaluating whether an output spectrum of the output radiation is flat and/or smooth over a range of wavelengths.

24. A broadband light source device according to clause 23, wherein said evaluation comprises determining whether the flatness of the spectral profile is better than 10 dB in a desired wavelength range.

25. A broadband light source device according to clause 23, wherein said evaluation comprises determining whether the flatness of the spectral profile is better than 5 dB in a desired wavelength range.

26. A broadband light source device according to any of clauses 23 to 25, wherein the processor is operable such that the evaluation further comprises evaluating whether said output spectrum exhibits a redshift of the centroid of the spectrum.

27. A broadband light source device according to clause 26, wherein the processor is operable such that the evaluation further comprises determining whether said output spectrum comprises one or more Raman sidebands.

28. A broadband light source device according to any of clauses 23 to 27, wherein said processor is operable to optimize values for one or more operating parameters of the broadband light source device, so as to ensure operation in the balanced Kerr-Raman nonlinear interaction regime.

29. A broadband light source device according to any of clauses 21 to 28, wherein said optical diagnostic device comprises a spectrometer.

30. A broadband light source device according to any preceding clause, wherein said broadband output comprises a wavelength range of 200 nm to 2000 nm, or a sub-range within this range.

31. A metrology device comprising a broadband light source device according to any preceding clause.

32. A metrology device according to clause 31, comprising a scatterometer metrology apparatus, a level sensor or an alignment sensor.

33. A method of generating broadband radiation using an optical component comprising a gas cell, a hollow-core photonic crystal fiber at least partially enclosed within said gas cell; a gas mixture comprising at least one Raman active molecular gas within said gas cell and said hollow-core photonic crystal fiber and a pump laser in optical connection with the said gas-filled hollow-core photonic crystal fiber, said method comprising:
    measuring output radiation, output from said optical component; and
    evaluating the measured output radiation so as to determine whether the broadband light source device is operating in a balanced Kerr-Raman nonlinear interaction regime.

34. A method according to clause 33, wherein the evaluation step comprises evaluating whether an output spectrum of the output radiation is flat and/or smooth over a range of wavelengths.

35. A method according to clause 34, wherein said evaluation comprises determining whether the flatness of the spectral profile is better than 10 dB in a desired wavelength range.

36. A method according to clause 34, wherein said evaluation comprises determining whether the flatness of the spectral profile is better than 5 dB in a desired wavelength range.

37. A method according to any of clauses 34 to 36, wherein evaluation step further comprises determining whether said output spectrum exhibits a redshift of the centroid of the spectrum.

38. A method according to clause 37, wherein evaluation step further comprises further comprises determining whether said output spectrum comprises one or more Raman sidebands.

39. A method according to any of clauses 33 to 38, comprising an optimization step to optimize values for one or more operating parameters relating to generation of said broadband radiation, so as to ensure operation in the balanced Kerr-Raman nonlinear interaction regime.

40. A method according to clause 39, wherein said operating parameters comprise one or more of: one or more pump laser parameters relating to the pump laser, one or more fiber parameters relating to said hollow-core photonic crystal fiber, and one or more gas mixture parameters relating to said gas mixture.

41. A method according to any of clauses 33 to 38, wherein the gas mixture comprises at least one Raman active molecular gas constituting more than 2% of said gas mixture.

42. A method according to any of clauses 33 to 38, wherein said at least one Raman active molecular gas constitutes at least 5% of said gas mixture.

43. A method according to any of clauses 33 to 38, wherein said at least one Raman active molecular gas constitutes at least 10% of said gas mixture.

44. A method according to any of clauses 33 to 43, wherein the gas mixture comprises said at least one Raman active molecular gas and at least one noble gas.

45. A method according to any of clauses 33 to 43, wherein said gas mixture comprises a mixture of at least two Raman active molecular gases.

46. A method according to clause 45, wherein said gas mixture consists of a mixture of two Raman active molecular gases.

47. A method according to any of clauses 33 to 46, wherein said balanced Kerr-Raman nonlinear interaction regime is formed with the pump laser in an anomalous dispersion regime.

48. A method according to any of clauses 33 to 46, wherein said balanced Kerr-Raman nonlinear interaction regime is formed with the pump laser in a normal dispersion regime.

Although specific reference may have been made above to the use of embodiments of the invention in the context of optical lithography, it will be appreciated that the invention, where the context allows, is not limited to optical lithography and may be used in other applications, for example imprint lithography. While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A broadband radiation source device, configured for generating a broadband output, the device comprising:
an optical component, comprising:
a gas cell, and
a hollow-core photonic crystal fiber at least partially enclosed within the gas cell; and
a gas mixture within the gas cell and the hollow-core photonic crystal fiber, the gas mixture comprising at least one Raman active molecular gas constituting more than 2% of the gas mixture,
wherein the broadband radiation source device is configured to operate in a balanced Kerr-Raman nonlinear interaction regime and output an output spectrum of the output radiation that is flat and/or smooth over a range of wavelengths.

2. The device as claimed in claim 1, wherein the at least one Raman active molecular gas constitutes at least 5% of the gas mixture.

3. The device as claimed in claim 1, wherein the at least one Raman active molecular gas constitutes at least 10% of the gas mixture.

4. The device as claimed in claim 1, wherein the balanced Kerr-Raman nonlinear interaction regime is defined by complementary processes comprising a Raman process and a Kerr-based modulational instability process, such that the output spectrum of the broadband radiation source device exhibits a spectral broadening.

5. The device as claimed in claim 1, further comprising a pump laser for outputting a plurality of pump pulses.

6. The device as claimed in claim 1, wherein the gas mixture comprises at least one noble gas and the at least one Raman active molecular gas.

7. The device as claimed in claim 1, wherein the gas mixture comprises a mixture of at least two Raman active molecular gases.

8. The as claimed in claim 1, wherein the hollow-core photonic crystal fiber is wholly comprised within the gas cell.

9. The device as claimed in claim 1, wherein the gas cell comprises a plurality of sub-cells, the plurality of sub-cells comprising at least two end sub-cells, enclosing respective ends of the hollow-core photonic crystal fiber.

10. The device as claimed in claim 1, wherein the at least one Raman active molecular gas constitutes between 10% and 30% of the gas mixture.

11. The device as claimed in claim 1, further comprising an optical diagnostic device configured to measure the output radiation, output from the optical component.

12. The device as claimed in claim 11, comprising a processor configured to evaluate the measured output radiation so as to determine whether the broadband radiation source device is operating in the balanced Kerr-Raman nonlinear interaction regime.

13. The device as claimed in claim 1, wherein the broadband output comprises a wavelength range of 200 nm to 2000 nm, or a sub-range within this range.

14. A metrology device comprising the device as claimed in claim 1.

15. A method for generating broadband radiation using a broadband radiation source device comprising: an optical component comprising a gas cell, a hollow-core photonic crystal fiber at least partially enclosed within the gas cell; and a gas mixture comprising at least one Raman active molecular gas within the gas cell and the hollow-core photonic crystal fiber and using a pump laser in optical connection with the gas-filled hollow-core photonic crystal fiber, the method comprising:
measuring output radiation, output from the optical component; and
evaluating the measured output radiation so as to determine whether the broadband radiation source device is operating in a balanced Kerr-Raman nonlinear interaction regime, wherein the evaluating comprises evaluating whether an output spectrum of the output radiation is flat and/or smooth over a range of wavelengths.

16. The method according to claim 15, wherein the evaluating comprises determining whether a flatness of a spectral profile of the output spectrum is better than 10 dB in a desired wavelength range.

17. The method according to claim 15, further comprising optimizing one or more values of one or more operating parameters relating to generation of the broadband radiation, so as to ensure operation in the balanced Kerr-Raman nonlinear interaction regime.

18. The method according to claim 15, wherein the gas mixture comprises at least one Raman active molecular gas constituting more than 2% of the gas mixture.

19. The method according to claim 15, wherein the balanced Kerr-Raman nonlinear interaction regime is defined by complementary processes comprising a Raman process and a Kerr-based modulational instability process, such that the output spectrum of the broadband radiation source device exhibits a spectral broadening.

\* \* \* \* \*

UNITED STATES PATENT AND TRADEMARK OFFICE
CERTIFICATE OF CORRECTION

| | |
|---|---|
| PATENT NO. | : 11,699,889 B2 |
| APPLICATION NO. | : 17/621723 |
| DATED | : July 11, 2023 |
| INVENTOR(S) | : Amir Abdolvand |

Page 1 of 1

It is certified that error appears in the above-identified patent and that said Letters Patent is hereby corrected as shown below:

On the Title Page

Item (73) Assignee:
Please correct "ASME NETHERLANDS B.V." to "ASML NETHERLANDS B.V."

Signed and Sealed this
Fifteenth Day of August, 2023

Katherine Kelly Vidal
*Director of the United States Patent and Trademark Office*